United States Patent [19]
Willem

[11] 3,955,823
[45] May 11, 1976

[54] OIL RING ASSEMBLY

[75] Inventor: Edward Frederick Willem, Baltimore, Md.

[73] Assignee: Koppers Company, Inc., Pittsburgh, Pa.

[22] Filed: Nov. 19, 1974

[21] Appl. No.: 525,136

[52] U.S. Cl. .............................................. 277/163
[51] Int. Cl.² .......................................... F16J 9/06
[58] Field of Search .......... 277/157, 158, 159, 160, 277/161, 162, 163; 267/138, 1.5

[56] References Cited
UNITED STATES PATENTS

| 1,796,791 | 3/1931 | Johnson | 277/160 |
| 2,395,429 | 2/1946 | Powell | 277/160 |
| 3,099,455 | 7/1963 | Mayfield | 277/163 |

FOREIGN PATENTS OR APPLICATIONS

| 1,963,914 | 6/1971 | Germany | 277/163 |

*Primary Examiner*—Samuel B. Rothberg
*Attorney, Agent, or Firm*—Oscar B. Brumback; Boyce C. Dent

[57] ABSTRACT

An oil ring assembly for internal combustion engine pistons including an annular split piston ring with an inner circumferential groove, a radially expandable split annular spring in the groove, and a bridging means in the groove spanning the gap between opposite ends of the piston ring. The spring is preferably a coil spring and the bridging means is preferably a cylindrical arcuate segment located between opposite ends of the spring with pins on each end extending inside the coils of the spring. Alternatively, the arcuate segment may be formed from a tightly wound coil spring. A second enbodiment utilizes a serpentine expander as the spring and the bridging means comprises a flat arcuate segment located in a notch in the expander adjacent the gap in the piston ring.

5 Claims, 11 Drawing Figures

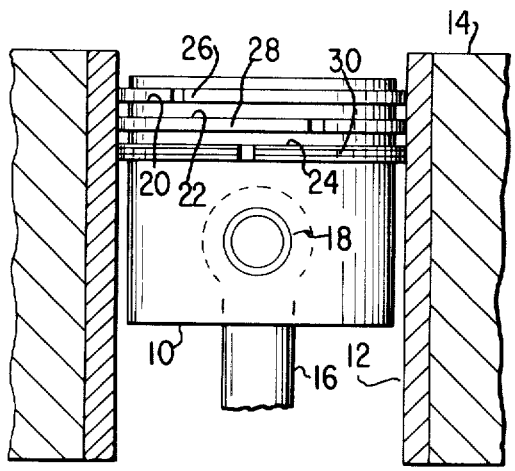
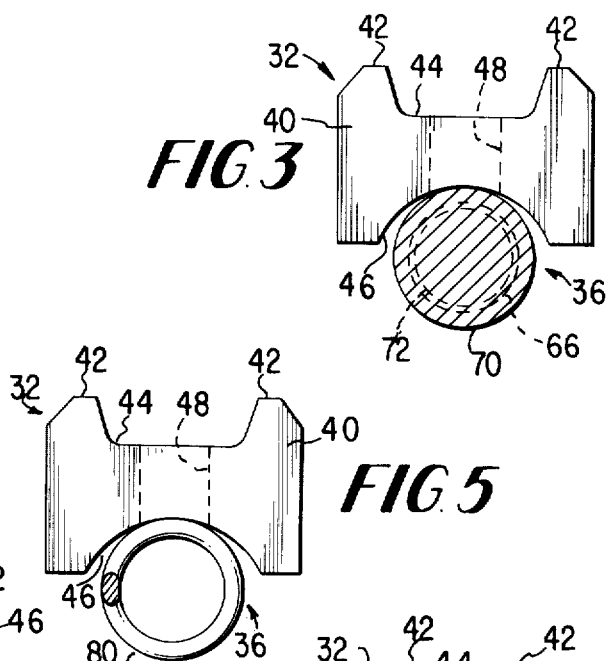
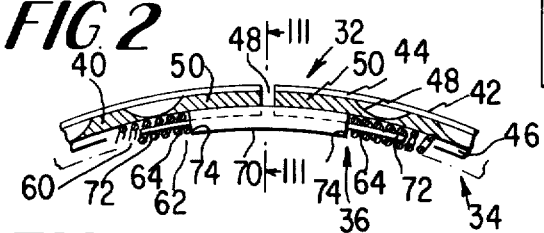
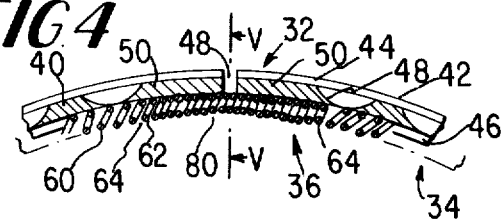
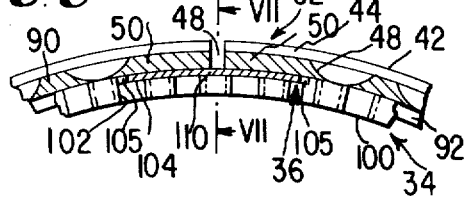
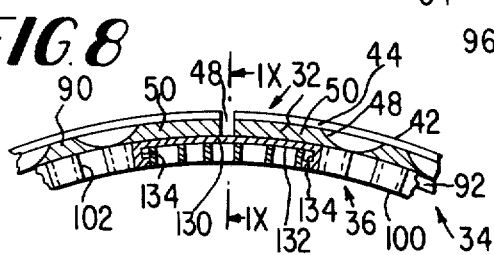
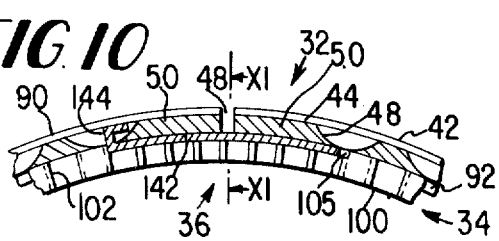

OIL RING ASSEMBLY

BACKGROUND OF THE INVENTION

1. Field of the Invention

The present invention relates generally to joint packing of the distinct radially acting bias type with bridging segments and more particularly to oil ring assemblies for internal combustion engine pistons utilizing radially acting coil and serpentine expander rings.

2. Description of the Prior Art

Conventional oil control ring assemblies for internal combustion engine pistons usually include a piston oil ring having one or more outer circumferential rails for sliding contact against the cylinder wall of the engine under considerable radial pressure to control the flow of oil along the cylinder wall as the piston reciprocates. The radial pressure is usually provided by an expander ring in an inner circumferential groove in the piston ring held in radial compression by the piston ring. Thus, the expander ring exerts a radial force against the piston ring to expand it against the cylinder wall.

Both the piston oil ring and expander are usually split to provide a gap in their circumference to accommodate expansion and contraction of the rings for assembly purposes and to compensate for uneven cylinder walls during operation. The expander ring spans the gap between adjacent opposite ends of the piston oil ring, and during expansion and contraction of the piston ring, the expander ring rubs against the end portions of the piston ring. Considerable wear results because the expander rings are usually made from a helically coiled spring, such as shown in Hesling U.S. Pat. No. 3,195,903, or are made in serpentine fashion as shown in Thomas et al U.S. Pat. No. 3,000,677. In both instances, edges of the expander ring are in rubbing contact with edges of the ends of the piston oil ring. Expansion and contraction of the rings results in fretting wear, mostly on the inner periphery of the piston oil ring. In extreme cases, however, the expander may wear so thin that it breaks resulting in loss of pressure between the ring and the cylinder wall and consequently a loss of oil pressure in the engine.

In addition, since the ring groove in the piston is usually wider than the thickness of the piston oil ring, the ends of the ring, which define the ring gap, tend to flutter in the ring groove since they are not supported at the gap. This also contributes to fretting wear between the ring and expander and also reduces the effectiveness of oil control by the assembly.

Accordingly, an object of the present invention generally is to provide an improved oil ring assembly for internal combustion engine pistons and more particularly to provide means for reducing wear of the piston oil ring normally caused by the expander ring, especially reducing wear of the end portions of the piston oil ring and reducing flutter of the end portions.

SUMMARY OF THE INVENTION

The foregoing and other objects and novel features are generally achieved by providing an annular piston ring member having a gap in its circumference for accommodating radial expansion and contraction of the ring, such ring including a groove in its inner perhphery of the type needed for a coil spring expander ring or of the type needed for a serpentine expander ring, and a bridging means in the groove spanning the gap in the piston ring member so that the ends of the piston ring member act against the bridging means and not against the expander ring.

More particularly, the bridging means may take the form most appropriate for the type of expander ring to be used. For example, for a coiled spring expander, the bridging means may be a short segment of an arcuately formed cylindrical rod, about the same diameter as the expander, that sits in the inner groove of the piston ring member between the ends of the expander ring. The segment is physically located at assembly to be adjacent the gap in the piston ring member, the length of the segment being greater than such gap when the piston ring member is expanded to its greatest diameter during operation.

The segment may also include pins on each end thereof of a diameter to extend into the inner diameter of the coiled spring expander to maintain alignment of the segment and the expander.

In lieu of the cylindrical segment, a segment of tightly wound coil spring may also be used in the same manner since adjacent coils of the tightly wound segment provide a substantially continuous surface bearing against the adjacent coils end portions of the piston ring member.

When a serpentine expander ring is used, the bridging means may simply be a short arcuate segment of flat material, preferably spring steel, located in the inner groove of the piston ring member and in a circumferential notch formed in the serpentine expander adjacent the gap in the piston ring member. In this construction, the serpentine expander is seated in the notch so as to contact the bottom of the groove in the piston ring member.

However, it is desirable for assembly purposes to reduce the number of individual parts that must be handled during installation of the rings on the piston. Thus, the arcuate segment may be glued in the notch in the expander before installation; however, the glue joint should be such that it will break free during operation so as not to restrict expansion and contraction of the expander ring.

Instead of the segment being glued in the notch, it may include radially extending end portions engageable with the expander to provide a unitary assembly of the expander and the segment. Alternatively, the segment may include a radially extending end portion engageable with the piston ring member to provide a unitary assembly of the piston ring and segment.

It should be recognized that any one of the described bridging means provides a substantially continuous surface against which the end portions of the piston ring member bear during expansion and contraction thereof. This both reduces wear of these end portions and supports them in the axial direction to reduce flutter. It should also be recognized that, following installation, the bridging means tends to stay in a position adjacent to the gap in the piston ring member.

The foregoing objects and novel features of the invention will appear more fully from the following detailed description when read in connection with the accompanying drawings. However, it is to be expressly understood that the drawings are not intended as a definition of the invention but are for the purpose of illustration only.

BRIEF DESCRIPTION OF THE DRAWINGS

In the drawings wherein like parts are marked alike:

3

FIG. 1 is a side view in partial cross-section showing a typical piston in a cylinder of an internal combustion engine with the oil ring assembly of the present invention installed on the piston;

FIG. 2 is a top view in partial cross-section of a portion of an oil ring assembly illustrating a cylindrical bridging means used with a coil spring expander ring;

FIG. 3 is an enlarged cross-section of the assembly of FIG. 2 taken along line III—III;

FIG. 4 is a top view in partial cross-section of a portion of an oil ring assembly illustrating a tightly coiled spring bridging means used with a coil spring expander ring;

FIG. 5 is an enlarged cross-section of the assembly of FIG. 4 taken along line V—V;

FIG. 6 is a top view in partial cross-section of a portion of an oil ring assembly illustrating a flat segment bridging means used with a notched serpentine expander ring;

FIG. 7 is an enlarged cross-section of the assembly of FIG. 6 taken along line VII—VII;

FIG. 8 is a top view in partial cross-section of a portion of an oil ring assembly illustrating a flat segment bridging means with radially extending end portions used with a notched serpentine expander ring;

FIG. 9 is an enlarged cross-section of the assembly of FIG. 8 taken along line IX—IX;

FIG. 10 is a top view in partial cross-section of a portion of an oil ring assembly illustrating a flat segment bridging means with a radially extending end portion used with a serpentine expander ring; and FIG. 11 is an enlarged cross-section of the assembly of FIG. 10 taken along line XI—XI.

DESCRIPTION OF THE PREFERRED EMBODIMENT

The present invention is used with a typical internal combustion engine piston such as illustrated in FIG. 1 in which a piston 10 reciprocates in the conventional manner in the bore 12 of an engine block 14 to drive connecting rod 16 pivotably secured to piston 10 by crank pin 18. Piston 10 is illustrated as being of the three ring type including top groove 20, intermediate groove 22, and bottom groove 24. Conventional split compression rings 26 and 28 are shown in grooves 20 and 22 respectively. An oil ring assembly 30 made in accordance with the present invention is shown in bottom groove 24.

The preferred construction of the oil ring assembly 30 includes a split piston ring member with an inner circumferential groove, a split radially acting spring member in the inner groove for expanding the piston ring member, and a bridging means in the inner groove spanning the gap between opposite end portions of the piston ring member.

An oil ring assembly 30 constructed in accordance with the foregoing is illustrated in FIGS. 2 and 3 in which numeral 32 generally identifies the piston ring member, numeral 34 generally identifies the spring member, and numeral 36 generally identifies the bridging means. These same numerals generally identify the same elements in the other figures.

The preferred construction of oil ring assembly 30 is illustrated in FIGS. 2 and 3 wherein piston ring member 32 includes a dual-rail oil control ring 40 of conventional construction. Ring 40 appears in cross-section in FIG. 3 which shows the rails 42 separated by an outer channel 44. The rails 42 may be chrome-plated if desired (not shown). The inner periphery of ring 40 includes a radially arcuate circumferential groove 46 as shown in FIG. 3 in which the spring member 34 and bridging means 36 are seated. A series of circumferentially spaced oil drain slots 48 connect outer channel 44 with inner groove 46. Ring 40 is annular as shown in FIG. 2 and includes a gap 48 in its circumference thus forming adjacent end portions 50. The gap 48 permits the ring 40 to radially expand into engagement with bore 12 and to contract during reciprocation of the piston 10 to compensate for any taper or unevenness of bore 12.

The spring member 34 in the construction of FIGS. 2 and 3 includes a radially expandable annular spring 60 of the helically wound coil type which is also split to form a wide gap 62 in its circumference thereby forming opposite end portions 64 as shown in FIG. 2. As well known to those skilled in the art, spring 60 will exert a considerable and continuous radial force against the ring member 40 thereby urging it into firm engagement with bore 12 as is desired. The groove 46 in ring member 40 retains the spring 34 so that it acts substantially against the axial center of ring 40 as shown in FIG. 3. The spring member 40, being a series of continuous coils, includes an inner diameter 66 and the end coils 64 are preferably ground flat in the radial direction as viewed in FIG. 2 in the well known manner.

The bridging means 36 in the construction of FIGS. 2 and 3 includes a cylindrical arcuate segment 70 seated in groove 46 in circumferential alignment with the spring member 60 and in abutting engagement with the opposite ends 64 of spring 60 and in the gap 62 between them. The outer diameter of the cylindrical segment 70 is substantially the same as the outer diameter of spring 60. The arcuate length of segment 70 is greater than the width of gap 48 of piston ring member 40, that is, the segment 70 spans the gap 48 so that the end portions 50 of ring 40 always bear against the smooth cylindrical surface of segment 70 rather than against the coils of spring 60 as they would in conventional assemblies, even with the ring 40 expanded to its largest operational diameter. In this manner, the fretting wear of the ring 40 usually caused by rubbing of spring 60 against it is substantially reduced.

For ease of assembly and to maintain circumferential alignment of the spring 60 and segment 70, the segment preferably includes circumferentially extending pins 72 extending into the inner diameter 66 of spring 60. Pins 72 may be doweled into segment 70 but are preferably formed integrally therewith as shown in FIG. 2 so as to form shoulder portions 74 for abutting engagement with the ends 64 of spring 60.

The construction illustrated in FIGS. 4 and 5 is similar in all respects to that of FIGS. 2 and 3 except for the construction of the bridging means 36. In this embodiment, the bridging means comprises a coiled arcuate segment 80 in groove 46 having a length greater than the width of gap 48 so that it spans the gap in the ring member 40 just as does cylindrical segment 70. The segment 80 is formed from a tightly wound helical coil spring so that the adjacent coils form a substantially continuous surface in contact with groove 46 along the end portions 50 of ring 40. This construction also reduces fretting wear of the ring 40 such as would occur with widely spaced coils. If desired, the coiled segment may be made from flat spring stock to provide an even smoother continuous surface in contact with groove 46. Although coiled segment 80 has been shown as a discrete piece, the spring 60 itself may be tightly coiled adjacent gap 48 for a distance equal to the length of the segment 80 and, for the purposes of this invention, doing so is considered equivalent to using the segment 80.

The construction illustrated in FIGS. 6 and 7 differs from those described above to the extent that the cross-sectional shape of ring member 90 is adapted to use a conventional serpentine type expander ring 100. Otherwise, its construction is similar to ring 40 and corresponding identifying numbers are used for similar parts thereof. The main area of change is in the inner circumferential groove which includes radial, outwardly converging, sides 92 terminating at a substantially flat outer circumferential surface 94 thereby forming a channel-shaped groove 96.

The annular spring means of FIGS. 6 and 7 comprises a serpentine expander 100 which is formed by corrugating a band of metal to form convolutions 102 extending radially outward from the circular center of the spring 100. The convolutions 102 are preferably rounded but may be substantially square as viewed radially (not shown). Ring 100 functions substantially the same as spring 60 except that it is usually capable of exerting greater radial force. It should also be recognized that the outer edges of the convolutions 102 are relatively sharper than the coils of spring 60 and therefore greater fretting wear normally occurs on ring 90 when serpentine expanders are used in the normal manner.

As best seen in FIG. 6, the outer periphery of serpentine expander ring 100 includes a circumferentially extending notch 104 that is located substantially diametrically opposite to the gap 62 in the expander ring 100 (gap not shown in FIG. 6), such gap being narrower than the one in FIGS. 2 and 4 that must accommodate bridging means 70 or 80. A bridging means 110 is placed in the notch 104 so that it lies in contact with the outer circumferential surface 94 of ring member 90 adjacent to and spanning the gap 48 in the ring 90. Thus, it can be seen that the gap in the expander ring 100 (not specifically shown but substantially identical to gap 62) lies diametrically opposite to the gap 48 of ring member 90 and the opposite ends of the expander 100 are fully supported in the channel-shaped groove 96 at that location.

The bridging means 110 comprises an arcuate segment of a flat piece of metal, greater in length than gap 48 and about the same width as expander 100, that is held firmly against the bottom 94 of the channel-shaped groove 96 by the portion of expander ring 100 beneath the segment 110 as best shown in FIG. 7. As previously explained, segment 110 may be initially glued to the tops of the convolutions 102 in the area of notch 104. Thus, as the ring member 90 expands and contracts, its end portions 50 slide easily against the smooth outer surface of segment 110 thereby reducing frictional wear therebetween. In addition, the end portions 50 of ring member 90 are fully supported in the axial direction which prevents them from fluttering during reciprocation of piston 10. The segment 110 is a little shorter than the length of notch 104 to provide a clearance 105 to accommodate expansion and contraction of the expander ring 100.

The construction illustrated in FIGS. 8 and 9 differs from that of FIGS. 6 and 7 only with respect to the bridging means 36; thus, the same identifying numbers are used where appropriate. Bridging means 36 comprises a flat arcuate segment 132, similar to segment 110, greater in length than gap 48 in ring member 90, spanning gap 48 as shown in FIG. 8. Radially inwardly extending flat end portions 134 are formed integrally with segment 132 and extend loosely between convolutions 102 of serpentine expander 100 as shown in FIGS. 8 and 9 and in interlocking engagement therewith. The end portions 134 are narrower than the segment 132 to permit them to extend between the convolutions 102 as shown in FIG. 9. It should be understood that one end portion 134 may extend into a convolution whose peak is on one axial side of the expander 100 and the other end portion may extend into a convolution whose peak is on the opposite side of the expander. Thus, one end portion 134 may be notched on one side to accommodate the thickness of the peak of a convolution and the other end portion may be notched on the opposite side for the same reason. Thus, the segment 132 is held against the outer surface 94 similar to the segment 110 so that the end portions 50 of ring 90 slide against it as previously described.

The construction shown in FIGS. 10 and 11 is similar in all respects to that of FIGS. 8 and 9 except for the construction of bridging means 36. Bridging means 36 includes a flat arcuate segment 142 in groove 96 adjacent to gap 48 and in contact with outer surface 94, the length of segment 142 being greater than the width of gap 48 in ring 90 so as to span it as shown in FIG. 10. A radially outward extending flat end portion 144 is formed integrally with segment 142 and extends outwardly into one of the oil drain slots 48 in ring 90 adjacent to one end portion 50. The end portion 144 is narrower than the width of segment 142 so that it fits loosely within the width of slot 48, as shown in FIG. 11, and in interlocking engagement therewith. Thus, a unitary assembly of ring 90 and bridging means 142 is formed to make it easier to install the assembly in groove 24 of piston 10. If desired, a specific slot 48 may be formed adjacent end portion 50 of ring 90 to hold end portion 144 of segment 142 rather than using the oil slot 48 as shown. Again, the segment 142 is held in groove 96 against outer surface 94 to fully support end portions 50 of ring 90 for sliding movement against a smooth surface to reduce wear and to reduce fluttering.

Thus, the invention having been described in its best embodiment and mode of operation, that which is desired to be claimed by Letters Patent is:

I claim:

1. An oil ring assembly for internal combustion engine pistons comprising in combination:
    an annular piston ring member having a gap in the circumference thereof for accommodating radial expansion and contraction of said ring member and having a radially arcuate circumferential groove in the inner periphery thereof;
    a radially expandable spring means having a gap in the circumference thereof, in said groove for radially expanding said ring member,
    said spring means comprising a helically wound coil spring means extending around the circumference of said groove and having opposite, spaced end portions; and
    bridging means held in said groove by said spring means for spanning said gap between adjacent end portions of said ring member for reducing wear of said end portions during expansion and contraction of said ring member, said bridging means comprising a cylindrical arcuate segment in said groove, having a length greater than said gap in said ring member, including circumferentially extending pin means, extending into an inner diameter of said coil spring means, forming shoulder means with said segment for abutting engagement with said opposite end portions of said coil spring means.

2. An oil ring assembly for internal combustion engine pistons comprising in combination:

an annular piston ring member having a gap in the circumference thereof for accommodating radial expansion and contraction of said ring member and having a circumferential groove in the inner periphery thereof, said circumferential groove comprising a channel-shaped groove having radial, outwardly converging, sides terminating at a substantially flat outer circumferential surface;

a radially expandable spring means, having a gap in the circumference thereof, in said groove for radially expanding said ring member, said spring means comprising serpentine expander means, in said channel shaped groove, having a circumferential notch in the outer periphery thereof substantially diametrically opposite to end portions of said serpentine expander means; and bridging means held in said groove by said spring means for spanning said gap between end portions of said ring member for reducing wear of said end portions during expansion and contraction of said ring member, said bridging means extending along said circumferential notch adjacent to said gap in said piston ring member.

3. The oil ring assembly of claim 2 wherein:

said bridging means comprises a flat arcuate segment, in said circumferential notch and against said outer circumferential surface, having a length greater than said gap in said ring member.

4. The oil ring assembly of claim 3 wherein:

said flat arcuate segment includes radially inwardly extending flat end portions extending between convolutions of said serpentine expander means for interlocking engagement therewith.

5. The oil ring assembly of claim 3 wherein:

said flat arcuate segment includes a radially outwardly extending flat end portion extending into a slot in said ring member for interlocking engagement therewith.

* * * * *